Aug. 19, 1952 J. W. HESSION, JR 2,607,571

AEROSOL GENERATOR

Filed March 15, 1946 5 Sheets-Sheet 1

INVENTOR

John W. Hession, Jr.

BY Austin, Wilhelm & Carlson

ATTORNEYS

INVENTOR
John W. Hession, Jr.
BY
Austin, Wilhelm Carlson
ATTORNEYS

INVENTOR
John W. Hession, Jr.
BY
Austin, Wilhelm & Carlson
ATTORNEYS

INVENTOR
John W. Hession, Jr.
BY
Austin, Wilhelm & Carlson
ATTORNEYS

Aug. 19, 1952 J. W. HESSION, JR 2,607,571

AEROSOL GENERATOR

Filed March 15, 1946 5 Sheets-Sheet 5

HOMOGENEOUS

HETERAGENEOUS

INVENTOR
John W. Hession, Jr.
BY Austin, Wilhelm & Carlson
ATTORNEYS

Patented Aug. 19, 1952

2,607,571

UNITED STATES PATENT OFFICE 2,607,571

AEROSOL GENERATOR

John W. Hession, Jr., Darien, Conn.

Application March 15, 1946, Serial No. 654,610

10 Claims. (Cl. 261—28)

This invention relates to aerosol generators and more particularly to a machine designed to effect a dispersion or diffusion of a selected liquid into particles which are extremely minute and substantially homogeneous in size and adapted to be readily air-borne for substantial distances.

The term "aerosol" is generally accepted in scientific circles as a generic term to describe the size of particles which may be air-borne in varying degrees. Air-borne or aerosol particles may vary in size from one tenth (.1) micron diameter or less, to upwards of fifty (50) microns diameter. One micron is approximately one twenty-five thousandths ($\frac{1}{25,000}$) of an inch, while fifty (50) microns are approximately one five hundredths ($\frac{1}{500}$) of an inch. The extent to which an aerosol particle may be air-borne varies with its size or mass. As a rough approximation, it may be said that the cubic mass of a particle is approximately the cube of its diameter, and accordingly a particle which is one hundred (100) microns in diameter would possess approximately one thousand times the cubic mass of a particle of ten (10) microns diameter.

It will be accordingly appreciated that the drift of fine particles in normal air currents is largely determined by the particle size, or more particularly, its cubic mass. According to Stokes law of falling particles, it has been determined that in a medium of still air, a particle of six microns in diameter will require approximately five minutes to fall one foot; a particle of ten microns will require approximately two minutes to fall one foot; a particle of twenty microns diameter will require approximately one half minute to fall one foot; while a particle of sixty microns diameter will require approximately three seconds to fall one foot. From the above considerations it follows that a particle released ten feet above the ground and having a diameter of ten microns will drift approximately a third of a mile over flat terrain before reaching the ground in an extremely light breeze moving at only one mile per hour; and the same particle will drift approximately one mile in a light wind breeze traveling at approximately three miles per hour. Aerosol particles which are fifty microns and larger in diameter will drift comparatively very short distances only and may be aptly classified as sprays. Therefore it may be said that a true aerosol has generally been considered as descriptive of particles which will be borne by normal air currents having particle size of less than sixty microns diameter.

These scientific determinations and considerations are guiding factors in effecting diffusion of liquid insecticides, germicides, deodorants, fungicides, plant hormones and like operations which are of the greatest importance in agricultural, industrial and public health operations. The particle size of the diffused liquid in many instances determines the effectiveness of the liquid treatment, the quantity or volume of liquid necessary to effect the treatment, the distances over which the dispersed liquid may be rendered effective, the uniformity of deposition and concentration, and finally the cost of effecting the dispersion and the avoidance of concentrations to the degree which are harmful or objectionable.

In the field of entomology, for example, highly valuable insecticides have been developed whose effectiveness and usefulness is to a large extent controlled and determined by particle size considerations. As one example, dichlorodiphenyltrichlorethane (generally referred to in the trade as DDT) a crystalline powder which may be dissolved and carried in a liquid carrier such as light oil, is highly useful in the destruction of mosquitoes, flies and various other insect pests when finely dispersed in concentrations approximating one tenth (.1) pound to not over one pound per surface acre. Localized concentrations of this insecticide as obtained by sprays generating particles of fifty (50) microns diameter and greater may cause damage to other useful life forms, such as bees and polinating insects, or may cause damage to the health of birds, fish and other wild life foraging on dead or alive insects contaminated to any material extent with such insecticide.

Entomologists have therefore appreciated the essential importance of effecting liquid insecticide dispersions in extremely fine particle size, wherein the required small quantity of effective insecticide is uniformly dispersed on leaf, shrub, grass and terrain areas, and in concentrations and particle sizes wherein the enemy insect is effectively destroyed, without damaging or deleterious effects on useful insects and other useful life. It is further appreciated that such insecticides can only be rendered fully effective when the treated area is substantially uniformly covered with the required extremely light concentration of the insecticide. Such effective light treatments can be practically effected by aerosol treatment of the area and wherein the particle size ranges in the approximate mean average of eight to fourteen microns in diameter, with an optimum or mean average of eight to ten microns in diameter in the case of certain insect pests, while other hardier insect pests may require dispersions having particle size ranges in the approximate mean average of sixteen to twenty microns.

Aerosol dispersions having extremely fine and substantially homogeneous particle size have further extensive uses in fumigating, sterilizing, humidifying, deordorizing and scenting room and building interiors. Aerosol treatment of rooms and interiors is markedly effective where the particle size is properly controlled and reasonably homogeneous, since the liquid aerosol dispersion will drift and uniformly disperse through the atmosphere of the confined space to fumigate, sterilize, humidify, deodorize or scent the enclosed atmosphere as conditions require. Further the aerosol dispersion of the selected liquid moves into all the spaces and crevices where air currents may enter and, finally be uniformly deposited above and beneath projecting surfaces which, when properly controlled, leaves no visible or objectionable deposit. The air in rooms and interiors can thus be sterilized, fumigated, deodorized, scented or humidified by use of controlled amounts of the liquid material containing the chemical ingredients desirable for the purpose. Building interiors may be treated with liquid insecticides to destroy flies and vermin by proper aerosol treatment in controlled concentrations to effect uniform deposition of the treating particles over all exposed surfaces and crevices around or into which air currents are admitted. Live stock may likewise be treated to render them immune to fly and insect attack by aerosol treatment when properly diffused, which in turn may be determined and controlled by the particle size of the dispersed liquid treating material.

The advantages and usefulness of aerosol treatment are now generally recognized in the various fields of entomology, agronomy, animal husbandry, public health and medicine. It has been further determined that the effectiveness and desirability of a particular aerosol treatment is governed by the uniformity of the dispersion in proper and allowable amounts. These highly desirable treatments and effects depend in turn on the propagation of particles of controlled and substantially homogeneous size.

Monumental efforts have been devoted to the development and invention of aerosol generators which will generate a liquid aerosol dispersion of controlled and substantially uniform particle size. Various machines and devices have been developed and tested, including spray nozzles through which the liquid material is ejected under high pressures, machines utilizing combustion gases and superheated steam, and aerosol bombs. Prior art machines and devices heretofore developed have either failed to produce aerosols having the particle size uniformity which proper treatment conditions prescribe, or which create fire or health hazards, or which require the dispersion of the liquid material in gases which are so highly heated as to damage the effectiveness or usefulness of the treating liquid, or which are cumbersome, expensive, difficult to control and operate, or otherwise impractical or unsatisfactory. Aerosol bombs have been tried and used, but have only a single use or require recharging, and require relatively expensive propelling agents such as methyl chloride.

In accordance with this invention, an aerosol generator is provided which is simple in design and construction, economical to manufacture, substantially foolproof in operation and which propagates an aerosol whose particle size may be adjusted and regulated, with the particle size having an extremely high degree of size uniformity. This invention involves the provision of superimposed adjacent surfaces which may be presented by adjacent metal plates or discs which are rotated at peripheral speeds of from three hundred to eight hundred feet per second. The liquid material is fed to the approximate center of the spinning surfaces and is ejected by centrifugal force from the periphery thereof. A guided current of air is projected in a confined stream across the peripheral edge of the spinning surfaces to effect dispersion of the extremely fine film or strings of liquid material centrifugally ejected from the periphery of the spinning surfaces. The surface forming members may be fixed to a common shaft rotated at the desired speed by any suitable power unit or driving device such as an electric motor, turbine or combustion engine. These rotating members may desirably comprise a pair of plates or discs whose inner contact faces are closely fitted and between which the liquid material is spread and centrifugally ejected. One or both of the plates may possess a certain inherent resiliency so as to exert a resilient but substantial filming pressure on the liquid layer squeezed therebetween.

The inner contact surface of one or both of the plates may be provided with extremely fine channels which need be no more than light scribe lines extending from or adjacent to the periphery inwardly for some distance. These channels or scribe lines provide minute channels into which the liquid film is fed or directed and which serves to develop the circumferential speed of the minute film or strings of liquid to substantially the speed of the spinning surfaces. This film or strings of liquid possess such a minute thickness that molecular cohesion is of low order, and subject to ready dispersion by the confined air stream which shaves across the high speed periphery of the rotating surfaces.

The liquid aerosol material may be fed into the approximate center of the adjacent spinning surfaces by any suitable liquid feed tube, and may be advantageously conducted through the hollow drive shaft. The rotating discs develop a vacuum area therebetween which serves to draw the liquid aerosol material through the feed tube and into the space between the rotating surfaces. Means are provided to control the flow of the liquid aerosol material through the feed tube and into the space between the rotating surfaces. It has been found that with given diametric size of rotating surfaces, rotating at a given speed, the particle size of the aerosol produced can be nicely regulated by the simple expedient of controlling the amount of flow of the liquid aerosol material to the spinning surfaces. Particle size may also be varied by varying the diametric size of the rotating surfaces, or varying the speed of rotation, or both.

It has been found that with this machine particle sizes can be nicely controlled within all the practical limits required. For example, tests have indicated that by using dispersion discs rotating at a peripheral speed of approximately four hundred to five hundred feet per second, and controlling only the flow of the liquid material to the discs, an aerosol may be produced having an average particle size of eight to ten microns, with less than two percent of the particles greater than twenty microns. This limited range of particle size is considered ideal for many entomological purposes. By increasing the flow of the liquid aerosol to these same spinning surfaces, tests have indicated that an average particle size of eighteen to twenty microns can be produced, which particle size is highly useful and effective in treating and exterminating some of the more hardy insects.

An object of this invention is to provide an aerosol generator designed to produce and generate an aerosol having particle size of substantial homogeneity.

Another object of this invention is to provide an improved machine for propagating aerosol having means for controlling, within practical and desirable limits, the particle size of the projected aerosol.

Another object of this invention is to provide an aerosol generator which is simple in design and construction, highly practical in use, economical to manufacture, and which is flexibly adapted to the various purposes of aerosol propagation.

Other objects of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which:

Figure 14:
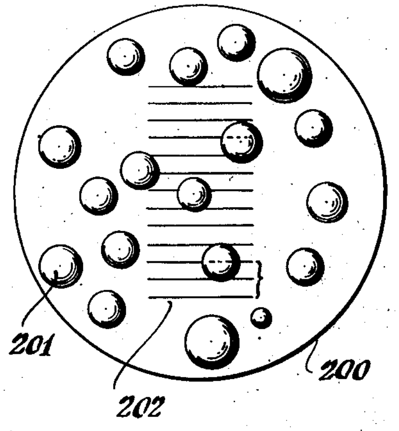
Figure 15:
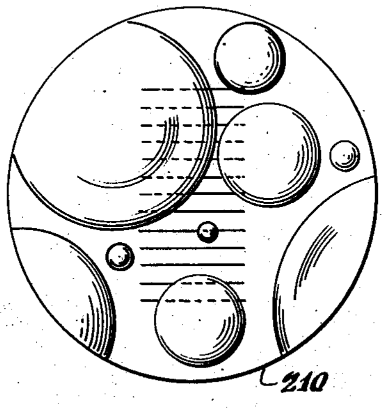

Fig. 14 is a diagrammatic illustration of a microscope slide as viewed under the microscope and showing a deposit of aerosol particles thereon which may be considered for practical purposes as substantially homogeneous in size, and Fig. 15 is a diagrammatic view of a microscope slide as viewed under a microscope showing aerosol particles which for practical purposes are considered heterogeneous, rather than homogeneous, in size.

Similar reference characters refer to similar parts throughout the several views of the drawings and the specification.

There is shown in Figs. 1 to 6 inclusive a practical embodiment of this invention which is operative to produce aerosol particles of substantially homogeneous size. In this embodiment a pair of spinning discs 1 and 10 are fixed to a hollow shaft 20 driven by a motor 30. The motor is suppotred within an enclosing casing 40 containing a blower fan 50 designed to produce the required air stream to assist dispersion and provide initial direction to the liquid particles. The casing 40 rests upon a suitable tank or receptacle 60 which contains the aerosol liquid.

In the embodiment illustrated in Figs. 1 to 4 inclusive, the driving motor 30 is connected directly to the shaft 20 which supports and rotates the paired dispersion members 1 and 10, without intermediate gearing. It will be appreciated that in using such direct connection the speed characteristics of the motor should be such as to rotate the dispersion members 1 and 10 at a speed effective to generate an aerosol of the required particle size. The motor 30 illustrated in Figs. 1 and 2 inclusive may be what is termed a high speed motor having a rotating speed of from sixteen to eighteen thousand R. P. M. It will be appreciated however that the type of motor used and its speed characteristics should be such as to rotate the paired dispersion members 1 and 10 at substantially constant speed for a predetermined aerosol treatment, and that the proper speed of rotation is determined by the diameter of the dispersion members and the particle size characteristics of the aerosol desired to be produced.

Figure 1:
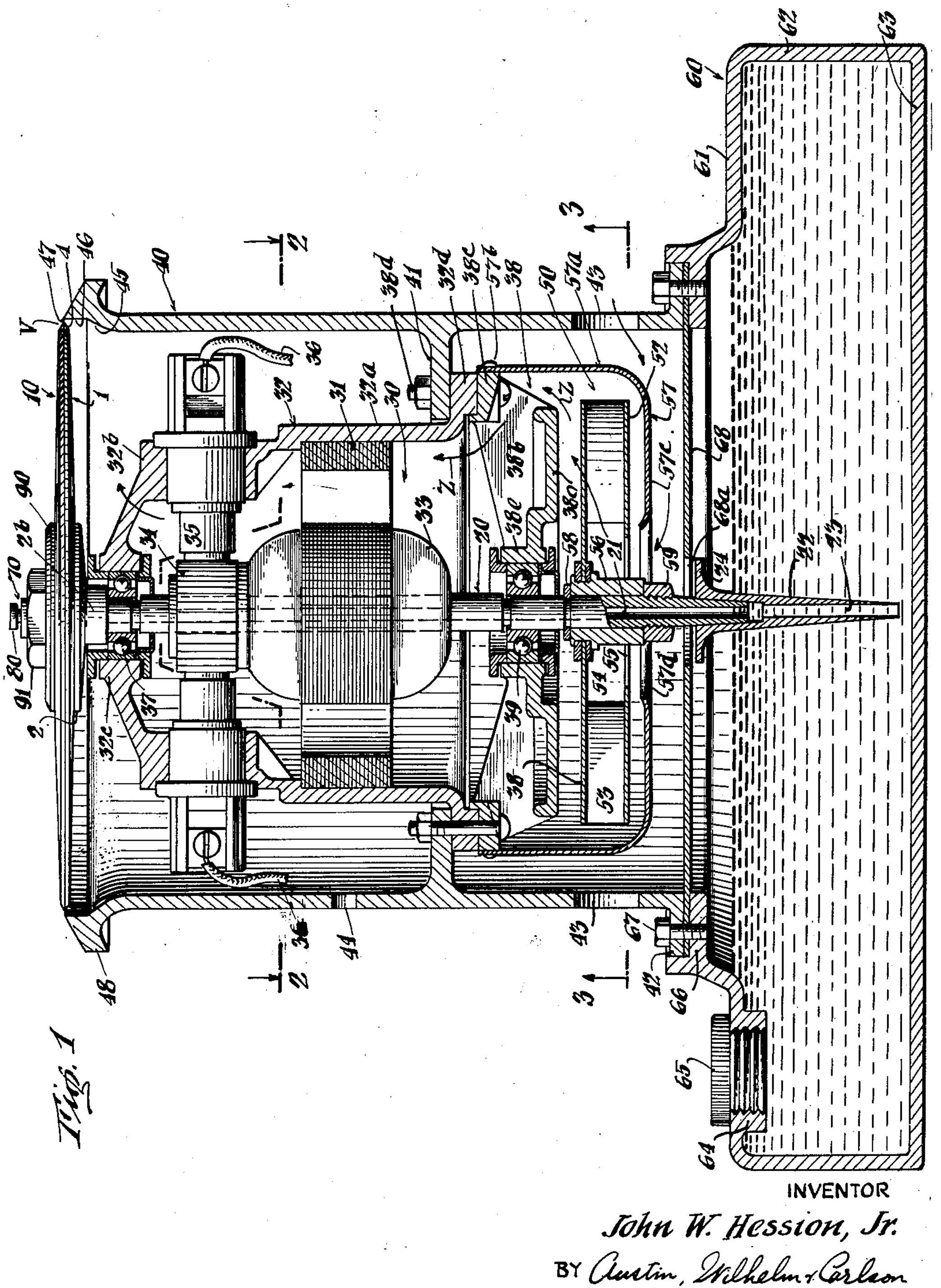
Fig. 1 is an elevational view showing one of the physical embodiments of this invention, certain parts thereof being shown in section.
Figure 2:
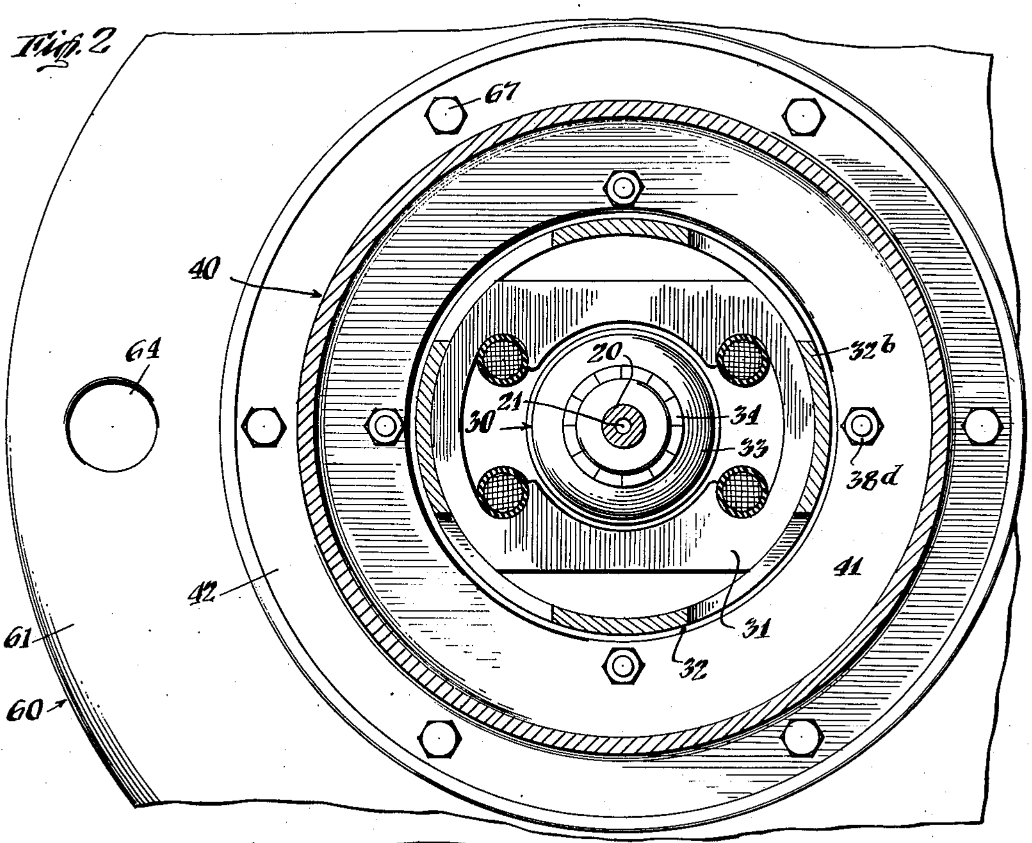
Fig. 2 is a cross sectional view of the embodiment shown in Fig. 1 as the same appears when viewed in the direction of the arrows 2—2 of Fig. 1.

Figs. 1 and 2 therefore are intended to illustrate one form of electric motor adapted for the purpose having a stator 31 fixed to and supported by a motor frame 32, and an armature 33 fixed to the shaft 20 and rotatable within the stator 31. The motor is provided with a commutator 34 fixed to the shaft 20, and associated stationary commutator brushes 35 fixed to the motor frame 32, with power supply wires 36 connected to the projecting ends of the commutator brushes 35.

The motor frame 32 has a generally tubular body portion 32*a* which surrounds and encloses the stator 31. An open or webbed frame work 32*b* rises from the tubular body portion 32*a* of the motor frame work and terminates in a collar portion 32*c* which supports a bearing 37 for the motor shaft 20. The opposite end of the tubular body portion 32*a* of the motor frame work is provided with an outwardly flared flange 32*d* to which is attached a spider frame 38. The spider frame 38 comprises a disc shaped portion 38*a* having radially extending webs 38*b* formed integrally therewith and whose outer ends are connected to a ring portion 38*c* connected as by bolts 38*d* to the laterally extending flange 32*d* of the motor frame 31. The disc portion 38*a* of the spider member 38 is provided with a collar portion 38*e* which contains a bearing 39 which supports the adjacent end of the motor shaft 20.

It will be appreciated that in the motor construction shown, air currents are free to travel through the open periphery of the spider frame 38 and into the tubular body portion 32*a* of the motor frame 31 to thereby cool the rotating motor parts, the air stream emerging from the motor through the open web frame work 32*b*. The direction of travel of the air currents through the motor is generally indicated by the arrows marked *z* on Fig. 1.

Figure 3:
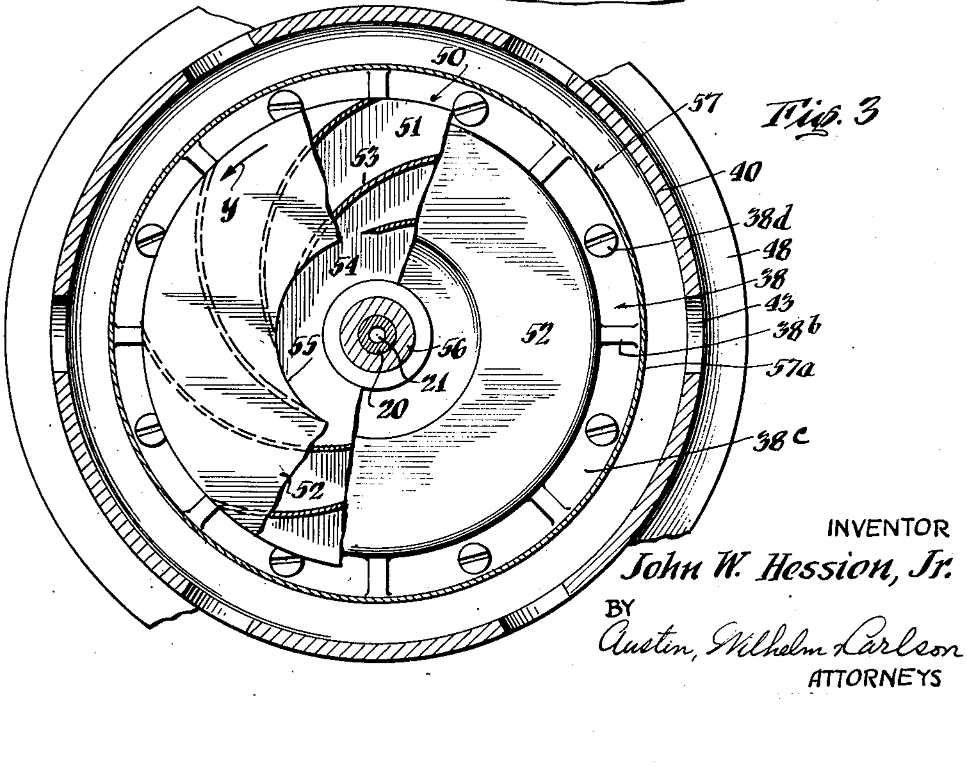
Fig. 3 is another cross sectional view of the machine as the same appears when viewed along line 3—3 of Fig. 1.

The motor 30 is supported within the tubular enclosing casing 40 in any suitable manner. For purposes of illustration, Fig. 1 shows the tubular enclosing casing 40 provided with an inwardly extending flange 41 formed integral therewith to which the motor assembly bolts 38*d* are connected. The casing 40 completely encloses the motor 30 as well as the blower fan 50 and may be provided with a laterally extending foot portion 42 which seats upon the inturned rim wall 61 of the aerosol liquid container or receptacle 60. As shown in Figs. 1 and 3, spaced holes or openings 43 are provided in the lower end of the casing wall 40 to admit air to the blower fan 50. The casing wall 40 may also be provided with a small opening 44 through which the power wires 36 leading to the commutator brushes 35 may be threaded.

The blower fan 50 may be of any desired construction. In the embodiment illustrated in Figs. 1 and 3, the blower fan 50 may comprise a pair of spaced side wall discs or plates 51 and 52 having a series of impeller vanes 53 positioned therebetween and solidly secured thereto. The impeller vanes 53 may be straight or curvilinear in shape and extend from the periphery of the side wall discs 51 and 52 inwardly short of the axis of rotation of the blower fan to provide an open central air receiving space 54. The side wall disc 52 has a central opening 55 through which air is admitted into the central space 54. The upper wall forming disc 51 has a sturdy hub portion 56 firmly secured thereto which is fixed to the motor shaft 20 so that the blower fan 50 is rotated by the motor shaft 20. The hub portion 56 may be clamped between a collar ring 58 fixed to the shaft 20 and a nut 59 threaded on the shaft 20.

The blower fan 50 is enclosed within a cup-shaped housing 57 having a tubular wall portion 57*a* which is secured as by screws 57*b* to the ring portion 38*c* of the spider frame 38 forming a part of the motor 30. The cup shaped housing 57 is provided with an inturned bottom wall portion 57*c* presenting an enlarged central opening 57*d* through which air is admitted to the central space 54 of the blower fan 50. When the blower fan 50 is rotated by the motor shaft in the direction of the arrow *y* shown in Fig. 3, air is drawn through the port holes 43 of the enclosing casing 40, through the central opening 57*d* of the blower fan housing 57, and thence into the central space 54 of the blower fan 50 from which the air is ejected by the impeller vanes 53 and driven through the motor 30 in the direction of the arrows *z* as previously described.

The receptacle or container 60 for containing the aerosol liquid may be of any desired shape or size. In the embodiment shown in Figs. 1 and 2, the container 60 presents an enclosing side wall 62 and a bottom wall 63 and an inturned rim wall 61. The rim wall 61 may be provided with a suitable inlet port 64 for filling the container which may be closed by a suitable closure cap 65. The rim wall 61 may also be provided with a raised seating portion 66 which provides a snug seat for the outturned flange portion 42 of the enclosing casing 40. The outturned flange 42 of the casing 40 may be secured to the seating portion 66 of the liquid aerosol container by means of suitable bolts 67. To avoid splashing of the aerosol liquid into the region of the blower fan 50 and motor 30, a metal partition wall 68 may be provided whose periphery is clamped between the seating portion 66 of the liquid container and the outturned flange portion 42 of the enclosing casing 40. The partition wall 68 may have a small opening 68*a* centrally thereof through which the motor shaft 20 projects.

In the embodiment illustrated in Figs. 1 to 6 inclusive, it will be noted that the motor shaft 20 is tubular or hollow throughout its length so as to provide a passage 21 through which liquid is conducted from the liquid pool in the container 60 to the opposite end of the shaft, where the liquid is distributed to the central space between the dispersion members 1 and 10. It will be appreciated that the hollow motor shaft 20 rotates at high speed and should preferably be made of non-corroding metal of high tensile strength and of a size to provide a substantial factor of safety in operation. The motor shaft 20 may be provided with a nipple attachment 22 at the lower end thereof which is securely fixed to the end of the shaft 20 so as to rotate therewith. The nipple 22 is of such length as to extend to a point adjacent the bottom wall 63 of the tank 60 so that substantially all of the aerosol liquid can be withdrawn therefrom. The nipple 22 has a tubular passage 23 therein which aligns with the passage 21 in the tubular motor shaft 20. Since the nipple 22 rotates with the motor shaft 20, it is desirable to provide the upper end of the nipple with a laterally projecting flange portion 24 which serves to cast off any aerosol liquid which may tend to worm its way up the outer periphery of the nipple and thence be sucked into the blower fan. The laterally projecting flange portion 24 may be arranged to seat closely adjacent the face of the partition plate 68.

A fundamental feature of this invention is the provision of dispersion means whereby aerosols of controlled and substantially homogeneous particle size may be propagated. Figs. 1, 4, 5 and 6 illustrate one practical embodiment of dispersion means made in accordance with this invention which as shown comprises a pair of disc-shaped plates preferably formed of non-corroding metal of high tensile strength. As shown more particularly in Fig. 4, the disc 1 may be of substantially uniform thickness throughout and is provided with a central aperture whereby the disc may be snugly telescoped over the end of the tubular motor shaft 20. The disc 1 seats against a flanged collar member 2 having a laterally extending flange portion 2*a* presenting a surface which is very slightly dished to provide a snug slightly dished seat for the dispersion disc 1. The flanged collar member has a tubular collar portion 2*b* which snugly embraces the outer periphery of the hollow motor shaft 20. The collar portion 2*b* may seat against the inner ring of the bearing 37 which rotates with the motor shaft 20.

The dispersion disc 1 may be clamped into seating position against the flanged collar member 2 by a distributor hub 70. The distributor hub 70 has a hollow interior to receive the end of the tubular motor shaft 20 and presents a cylindrical body wall 71 one end of which is closed by a top wall 72 and the other end thereof having a laterally flared flange 73. The distributor hub 70 should be made of non-corrosive metal of high tensile strength and the cylindrical wall 71 is provided with threads 74 on the interior surface thereof which have threaded engagement with the adjacent threaded end of the tubular motor shaft 20. The distributor hub 70 may be tightened so that the flange portion 73 thereof will snugly seat against the adjacent face of the dispersion disc 21 so as to firmly and rigidly clamp the disc between the flange portion 73 of the distributor hub 70 and the seating flange 2*a* of the seating collar 2.

The dispersion disc 10, preferably formed of non-corroding metal of high tensile strength, has substantially the same diameter as its companion dispersion disc 1 and is provided with an axial hole sized to snugly telescope over the outer periphery of the cylindrical wall 71 of the distributor hub 70. The center portion of the dispersion disc 10 seats snugly against the flange portion 73 of the distributor hub 70 so that the flange portion 73 is sandwiched between the paired dispersion discs 1 and 10. The dispersion disc 10 may be of substantially uniform thickness, but its center area is stiffened and reinforced by a metal washer 90 which snugly seats thereover and is pressed against the dispersion disc 10 by a lock-nut 91 having threaded engagement with the threaded exterior surface of the cylindrical wall 71 of the distributor hub 70. It will be noted that the stiffening washer 90 has approximately the same diameter as the seating flange 2*a* of the seating collar 2 so that both dispersion discs are reinforced and stiffened over the central area thereof, the central areas of the disc being nevertheless retained in space relationship by the flange portion 73 of the distributor hub 70.

It is important to note that either one or both of the dispersion discs 1 and 10 are slightly saucer shaped so that when clamped in operating position, their adjacent surfaces are resiliently held in face to face contact from the periphery of the discs to a substantial distance inwardly thereof. The adjacent inside surfaces of the dispersion discs 1 and 10 are finely lapped and interfitted so that when the discs are clamped together, the adjacent surfaces thereof are in close fitting contact over a substantial area extending from the periphery of the discs inwardly. In the construction shown in Fig. 4, both of the dispersion discs 1 and 10 are somewhat saucer shaped and possess an inherent resiliency which permits a substantial circumferential area adjacent the periphery thereof to be pressed into face to face contact when mounted in operative position. It will be appreciated however that one of the dispersion discs may be made substantially rigid and the other dispersion disc made stiffly resilient to attain the desired surface pressure contact between the adjacent disc surfaces in the circumferential area of the discs.

Figures 5, 6:
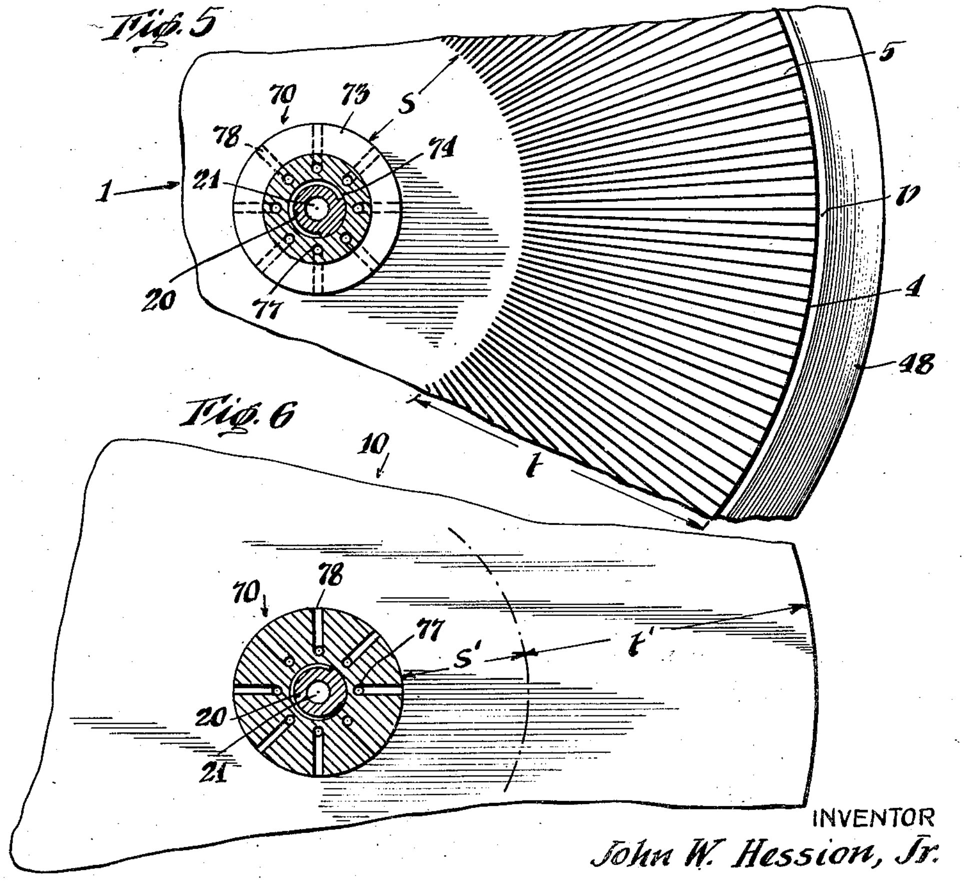
Fig. 5 is an enlarged fragmentary cross sectional view showing the scribe lines on the lower spinning disc as the same appears when viewed in the direction of the arrows 5—5 of Fig. 4.
Fig. 6 is an enlarged fragmentary cross-sectional view of the machine as the same appears when viewed in the direction of the arrows 6—6 of Fig. 4, this view showing particularly the contact surface of the upper spinning disc and a cross section of the liquid distributor hub.

The central area of the dispersion disc 1 designated as area *s* in Fig. 5 presents a smooth and polished surface which may be appropriately called the distribution and filming area. The surface area *s* is maintained in space relationship from the equivalent surface area *s'* of the companion dispersion disc 10 by the interleavened flange portion 73 of the distributor hub 70. The space between the smooth and polished surface areas *s* and *s'* provide a cavity which need not exceed one-sixteenth ($\frac{1}{16}$) of an inch in depth and into which cavity the aerosol liquid is received. The cavity between the polished surfaces *s* and *s'* is also under a rather high vacuum during operation which facilitates or assists the injection of, or draws the aerosol liquid between, the revolving dispersion discs.

Figure 4:
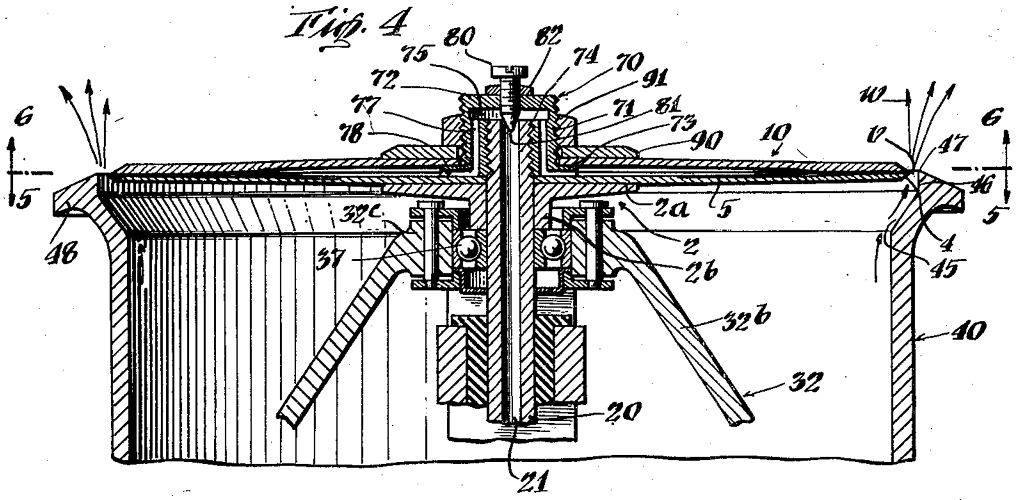
Fig. 4 is a vertical cross sectional view showing the spinning discs and a portion of the associated drive shaft and casing, this view illustrating further details.

The surface area of disc 1 designated *t* in Fig. 5, and the corresponding surface area of disc 10 designated *t'* in Fig. 6, may be appropriately designated "the speed pickup area" and over which area the adjacent surfaces of the discs are substantially in resilient contact. One of the discs, and preferably the disc on which the aerosol liquid is deposited such as the disc 1 shown in Figs. 4 and 5, is provided with minute channels or light scribe lines 5 which may extend from the periphery 4 of the disc 1 inwardly for a substantial distance. Thus the speed pick up area *t* of the disc 1 is delineated with a large number of closely spaced scribe lines 5 whose inner ends pick up and receive the liquid aerosol film from the evening area *s*. The aerosol liquid is driven outwardly through the minute channels formed by the scribe lines 5 to the disc periphery 4 by centrifugal force. When the minute strings or film of aerosol liquid are discharged from the outer rim of the disc it has acquired a peripheral speed which approximates the peripheral speed of the disc. The corresponding speed pick up area *t'* of the corresponding companion disc 10 serves to maintain the liquid flow in the minute channels 5 on the surface area *t* of disc 1.

The distributor hub 70 operates in the nature of a pump to withdraw the aerosol liquid from the tubular passage 21 in the shaft 20 and distributes the liquid to the central area between the dispersion discs 1 and 10. It will be noted more particularly by Fig. 4 that the under surface of the top wall 72 of the distributor hub is spaced a small distance from the end of the tubular shaft 20 to provide a small cavity space 75 into which the aerosol liquid may flow from the passage 20. The cavity 75 communicates with a plurality of spaced passages 77 extending longitudinally within the side wall 71 of the distributor hub. Each longitudinal passage 77 communicates with a groove passage 78 formed in the outside face of the flange portion 73 of the distributor hub. The groove passages 78 extend substantially radially as shown in Figs. 5 and 6 and extend to the peripheral edge of the flange portion 73. In this arrangement the aerosol liquid withdrawn from the tubular passage 21 in the tubular shaft 20 flows into the cavity 75, then through the longitudinal passages 77 in the side wall 71 of the distributor hub, then outwardly through the groove passages 78 in the flange portion 73 thereof, then into the central space between the evening surfaces *s* and *s'* of the dispersion discs 1 and 10.

The liquid thus discharged on the surface *s* is distributed or filmed into an extremely thin layer which is effected by the high speed rotation of the dispersion disc 1 and the natural tendency of the liquid to even out or spread over the smooth and polished filming surface *s*. Since the distributor hub rotates with the shaft 20, the liquid in the cavity 75 is drawn into the longitudinal passages 77 and then into the radial groove passages 78 so that the centrifugal impelling force exerted on the liquid by the radial passages 78 results in a withdrawing suction on the liquid within the shaft passage 21 which is further augmented and increased by the vacuum or suction in the central space between the discs as the liquid is impelled outwardly by the high rotative speed of the discs.

The volume of liquid permitted to enter the distributor hub and thence to the central space between the dispersion discs may be controlled and regulated by a small set screw 80 which is threaded into the top wall 72 of the distributor hub in accurate alignment with the liquid passage 21 in the tubular shaft 20. The set screw 80 is provided with a tapered end 81 designed to seat within the open mouth of the liquid passage 21 and is so shaped that the amount of liquid permitted to be discharged from the end of the liquid passage may be accurately and nicely controlled. A lock nut 82, threaded to the adjusting screw 80, may be provided to lock the adjusting screw in any desired flow control position.

It will be appreciated that while the distributor hub 70 and its associated parts provide a highly effective means of supplying the aerosol liquid to the central space between the surfaces *s* and *s'* of the dispersion discs, it will be appreciated that other devices may be employed to feed or inject the aerosol liquid into the central space between the dispersion members. For example, a feed tube separate and apart from the disc driving shaft and having one or more liquid emission openings located between the dispersion discs may be adaptably provided. The amount of liquid conducted to the dispersion discs may also be controlled by any suitable valve control means conveniently located in the liquid supply line.

A further important feature of this invention resides in the provision of means for directing a blast of air transversely across the peripheral edges of the rotating dispersion members to assist in the dispersion of and give initial direction to the liquid material centrifugally ejected from the periphery of the paired dispersion members. In the embodiment illustrated in Figs. 1 to 4 inclusive, the necessary stream of air is supplied by the blower fan 50 previously described. The stream of air first passes through the motor frame work to maintain the motor parts in cool condition. The stream of air is guided by the casing 40 in a manner so as to require the stream of air to shave transversely across the peripheral edge of the spinning dispersion members.

In the embodiment shown in Figs. 1 to 6 inclusive the cylindrical casing 40 is provided with an interior surface 45 which merges into a rising surface 46 whose terminal point 47 lies substantially in the plane of the surface area *t* of the spinning disc 1. The rising air guiding surface 46 of the casing 40 is spaced a radial distance *v* from the peripheral tip of the dispersion disc 1, which distance need be no more than approximately one sixteenth ($\frac{1}{16}$) of an inch or less. All of the air generated by the blower fan is required to escape through the limited rim space *v* and the air thus moves at considerable velocity through the space to thereby assist in the dispersion of liquid material centrifugally ejected from the periphery of the paired dispersion members, so as to produce an aerosol dispersion of substantially homogeneous particle size. The aerosol generated at the peripheral rim of the dispersion members is projected initially in the approximate direction of the arrows *w* as shown in Fig. 4 and moves into the atmosphere very similar to a billowing cloud which will rise vertically for a substantial distance and at the same time disperse laterally in all directions as influenced by the air currents of the atmosphere.

The tubular casing 40 may, if desired, be provided with a laterally extending reinforcing rim and protecting guard 48. If desired, a carrying handle for the machine may be provided which may be attached to the guard rim 48. The aerosol generator illustrated in Figs. 1 to 6 inclusive is a compact unit which may be built in any desired size for either interior or exterior aerosol treatment. This generator may be thrown into and out of operation by the provision of a simple electric switch placed in the power line which supplies the current to the motor.

When the motor 30 is energized, the blower fan 50 and the dispersion discs 1 and 10 are rotated at the speed desired to effect the particular aerosol treatment. During initial rotation of the dispersion discs 1 and 10, the air which may be pocketed therebetween is quickly expelled by centrifugal force from the rim of the discs, and a substantial vacuum is accordingly created which draws the aerosol liquid up through the tube passage 21, further assisted by the pumping action of the distributor hub 70. In the few seconds required to bring the dispersion discs up to speed, the suction effect created will have filled the tube passage 21 with liquid which will emerge through the distributor hub passages 76, 77 and 78 to the evening area *s* of disc 1, thence guided into the minute channels 5 of the disc and centrifugally discharged. The liquid particles centrifugally discharged from the rim of the paired discs will be picked up by the air stream generated by the blower 50 driven through the narrow slotted opening *v* between the casing surface 46 and the periphery of the dispersion discs, culminating in a propagated aerosol of substantially homogeneous particle size.

The dispersion discs may be rotated at any desired speed by the provision of a variable speed motor whose rotating speed is subject to control. The size of the aerosol particles may be controlled by adjusting the setting of the set screw 80 to control the volume of aerosol liquid admitted to the dispersion discs. The size of the aerosol particles is also subject to control by varying the rotating speed of the driving motor, thereby varying the peripheral speed of the dispersion discs.

With an aerosol generator of the type shown in Figs. 1 to 6 inclusive and having dispersion discs of approximately six inches in diameter, from two to three gallons of liquid may be dispersed per hour, which aerosol has substantially uniform particle size in the order of eight to ten microns as a mean average. By adjusting the setting of the set screw 80 the volume output of liquid may be substantially increased, with production of an aerosol having a substantially homogeneous particle size with a mean average of eighteen to twenty microns diameter. The aerosol generator here illustrated need weigh only ten to twenty pounds and therefore can be easily carried about to the location desired. It will be appreciated however that this generator may be substantially larger in size as may be desired and of almost any desired capacity by increasing the diameter of the dispersion discs and the size of the associated parts. It will also be appreciated that the particle size of the aerosol produced is governed not only by the amount of liquid supplied to the dispersion members, but by the peripheral speed of the rotating dispersion members which is a function of the speed of rotation and the effective diameter of the members.

Figures 7, 8, 9:
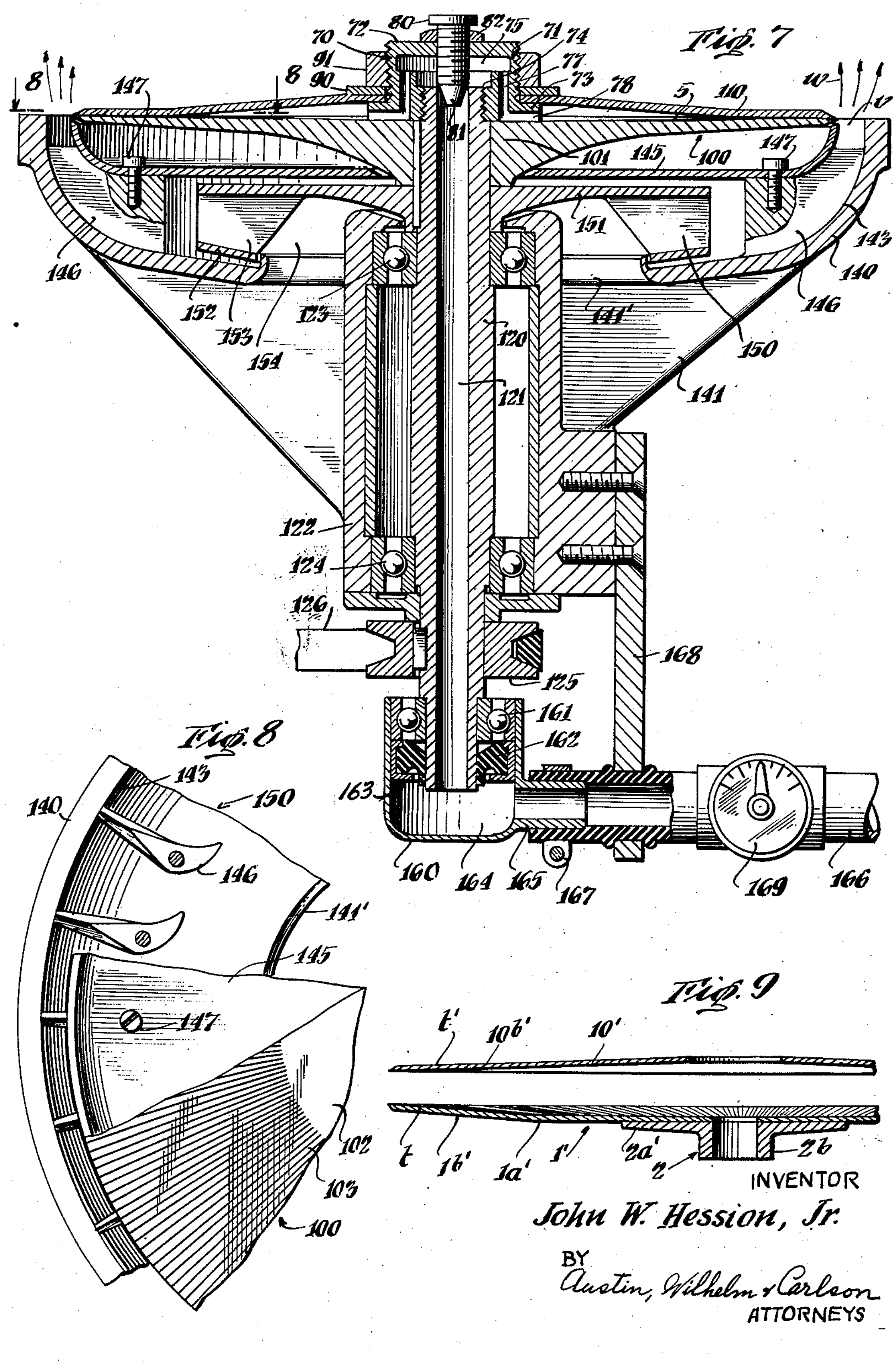
Fig. 7 is a longitudinal cross sectional view of a somewhat modified embodiment of this invention.
Fig. 8 is a fragmentary cross sectional view of the embodiment shown in Fig. 7 as the same appears when viewed along line 8—8 thereof.
Fig. 9 is a fragmentary transverse cross sectional view of a pair of cooperating spinning discs of somewhat modified construction.

The essential features of this invention may be incorporated into various physical embodiments which may vary considerably in form. As a further physical embodiment of this invention, there is shown in Figs. 7 and 8 a modified form of aerosol generator which nevertheless embodies the essential principles of paired spinning surfaces between which the liquid is squeezed during high speed rotation thereof, the minute strings or film of liquid ejected from the periphery of the paired spinning surfaces being dispersed and disrupted by a confined air stream. As shown in Fig. 7 this modified form of aerosol generator comprises a dispersion member 100 of generally circular shape having a heavy hub portion 101 splined or otherwise fixedly secured to the tubular drive shaft 120 having a liquid passage 121 therein. It will be noted that the dispersion disc 100 has its greatest thickness in the hub area 101 and gradually reduces in thickness as the peripheral edge is approached. The dispersion disc 100 can therefore be said to be relatively rigid and unyielding except at the extreme peripheral area thereof.

The dispersion disc 100 is held to the tubular shaft 120 by a distributor hub 70 of the form heretofore described having a cylindrical body wall 71, a top wall 72 and a laterally flared flange 73. The internal surface of the cylindrical side wall 71 is threaded at 74 to the adjacent threaded end of the tubular shaft 120. The distributor hub has a small cavity 75 therein which receives the liquid from the passage 121, a plurality of bleeder passages 76 extending radially therefrom communicating with passages 77 extending longitudinally within the side wall 77, and which in turn communicate with the radially extending groove passages 78 in the flange portion 73 thereof.

A companion dispersion disc 110 preferably formed of non-corroding metal of high tensile strength, has a central opening therein which snugly receives the body portion 71 of the distributor hub which telescopes therethrough. The dispersion disc 110 is generally saucer-shaped, has substantial inherent resiliency, may be of substantially uniform thickness and be equal in diameter to the diameter of the dispersion member 100. A stiffening washer 90 seats against the center portion of the dispersion disc 110 and is held in position by a threaded nut 91 which has threaded engagement with the cylindrical body 71 of the distributor hub. It will be noted that when the nut 91 is tightened so as to press the center portion of the dish shaped dispersion disc 110 against the flange portion 73 of the distributor hub, the inner peripheral surface of the dispersion disc will be firmly pressed against and in peripheral contact with the adjacent peripheral surface of the dispersion member 100, which contact will be maintained by the resilient pressure exerted by the disc 110 and the vacuum effect produced between the discs during rotation.

As an illustrative modification, the liquid receiving face of the dispersion member 100 may be channeled or rifled by a large number of minute grooves or channels 103 which extend radially from the filming surface 102 adjacent the outlet ends of the groove passages 78 in the distributor hub to the periphery of the dispersion disc 100, as shown in Figs. 7 and 8. The minute grooves 103 extend completely around the circumference and may be graduated in depth, the depth of the grooves 103 being greatest at the inner ends and tapering gradually to an almost imperceivable depth at the disc periphery. The minute grooves 103 provide the speed pick up area for the liquid aerosol moving by the impetus of centrifugal force to the rim of the disc. The adjacent peripheral surface portion of the dispersion disc 110 has a lap fit with the adjacent peripheral surface of the dispersion disc 100.

The tubular shaft 120 is supported by a tubular bearing block 122 having a pair of spaced bearings 123 and 124 mounted therein which rotatably support the tubular shaft 120. The shaft 120 may be driven by any suitable power source, there being shown for purposes of illustration, a pulley wheel 125 fixed to the tubular shaft 120 which may be driven by suitable belting 126 connected as desired to a combustion engine, turbine or electric motor.

The aerosol liquid is supplied to the tubular passage 121 by a cup 160 into which the lower end of the tubular shaft 120 extends. A bearing 161 is mounted within the cup 160, the inner sleeve of which is connected to the lower end of the tubular shaft. A suitable packing material 162, supported by a shelf 163 secured within the cup 160, may be provided to prevent leakage of the aerosol material contained within the cavity 164 within the cup to the bearing 161. It will be appreciated that the cup 160 is held stationary, while the lower end of the tubular shaft 120 is free to rotate therein, whereby the aerosol liquid can be withdrawn from the cup cavity 164 into the liquid passage 121 within the shaft. The cup 160 may be provided with a tubular inlet port 165 attached to a suitable supply conduit 166 by means of a clamp device 167. The supply conduit 166 and the cup 160 may be supported from the stationary bearing block 122 by means of a suitable hangar strut 168. The supply conduit 166 may also be provided with a suitable control valve 169 for controlling the flow of the aerosol liquid to the cup 160.

The machine shown in Figs. 7 and 8 is provided with a blower fan 150 which may be mounted adjacent the dispersion disc 100. The blower fan illustrated comprises a heavy back wall disc 151 of appropriate weight and strength which is keyed to the tubular shaft 120 and which may rest upon the inner rotating ring of the bearing 123. A side-wall forming ring 152 is joined to the side wall disc 151 by a plurality of radially extending vanes 153. The fan is provided with a central space 154 which receives the entering air and which is then impelled from the periphery of the fan by the rotating impeller vanes 153 thereof.

A stationary cup shaped casing 140 is supported by any suitable means such as sturdy webs 141 joined to the bearing block 122. The cup shaped casing encloses the blower fan and rises circumferentially to the peripheral edge of the dispersion disc 100. The cup shaped casing 140 is provided with an enlarged central opening 141' through which air is drawn from the atmosphere and passes into the central fan space 154. The inner surface 143 of the casing 140 is shaped to provide an exterior guide wall for directing the air stream from the fan to a position to move transversely across the peripheral edge of the dispersion discs.

An air deflecting wall 145 of generally dish shaped contour is retained in spaced relationship with respect to the interior surface 143 of the casing 40 by spaced deflecting vanes 146 rising from the interior surface 143 of the casing 140. The deflecting wall 145 may be formed of suitable sheet metal and may be secured to the deflecting vanes 146 as by screws 147. The air stream ejected by the blower fan 150 is guided in its travel by the curved interior wall surface 143 of the casing 140 and the deflecting member 145. It will be appreciated that the stationary deflecting vanes 146 serve to rectify the air stream discharged by the impeller vanes 153 from a tangential direction to a generally radial direction so that the aerosol will be projected in the general direction of the arrows *w* as shown in Fig. 7. The discharge mouth *v* of the casing 140 should be of narrow width, preferably not exceeding one quarter (¼) of an inch and approximately in the nature of about one sixteenth ($\frac{1}{16}$) of an inch.

The aerosol liquid supplied to the generator illustrated in Fig. 7 may be contained in any suitable supply tank from which the liquid is supplied by the conduit 166 to the receptor cup 160 adjacent the lower end of the tubular shaft 120. The liquid is drawn up through the passage 121 by the suction or vacuum created by the rotating dispersion discs 100 and 110. The flow of liquid to the dispersion discs may be controlled by the provision of a set screw 80 associated with distributor hub 70, or alternatively the liquid flow may be controlled by a metering flow control valve 169 associated with supply conduit 166. The generator as illustrated in Fig. 7 may be driven by any desired power unit and may be of any desired size. The unit shown in Fig. 7 may be mounted on a vehicle and if desired a plurality of such units may be used where large volumes of aerosol are to be generated.

Considerable latitude in the form and design of the paired dispersion members may be made within the teachings of this invention to produce aerosols for various purposes. Fundamentally the paired dispersion members should be mounted to rotate at relatively high speed to effect a peripheral velocity of approximately two hundred to eight hundred feet per second. The dispersion members should preferably, but not essentially, be circular in section. Paired dispersion members between which the liquid aerosol is supplied should have a central space or cavity therebetween to receive the liquid and at least the peripheral edge portion of the adjacent surfaces should essentially be in smooth fitting contact.

Preferably at least one of the dispersion members should either be resilient or resiliently mounted to maintain a predetermined pressure contact between a peripheral portion of the adjacent surfaces when stationary. Unless the dispersion members have even and uniform edge contact when stationary, an aerosol of uniform particle size cannot be expected. The centrifugal force which tends to drive the liquid outwardly between the adjacent surfaces of the dispersion members exerts a certain spreading pressure against the surfaces, which pressure varies with the amount of liquid being driven to the periphery. Hence a relatively large volume of liquid may exert sufficient pressure against the inner adjacent surfaces of the dispersion members to effect a slight separation of the peripheral contact surfaces, which produces an aerosol of larger particle size with a given pair of dispersion members.

As further illustrative of the various types of dispersion members which conform to the teachings of this invention, there is shown in Fig. 9 a dispersion disc 1′ fixed to a supporting collar 2 adapted to be attached to the tubular motor shaft.

In the embodiment here shown the flange portion 2*a*′ of the collar member 2 has a substantially flat seating surface and the dispersion member or disc 1′ has a central portion 1*a*′ which is relatively flat and which merges into a slightly rising edge portion 1*b*′. The dispersion disc 1′ is preferably formed of metal of high tensile strength and may be substantially uniform in thickness. The companion dispersion member 10′ is dish shaped or concave throughout and also preferably formed of metal of high tensile strength. When the dispersion disc 1′ and 10′ are clamped together centrally thereof, the lapped surfaces *t* and *t*′ thereof would be pressed into resilient surface contact to exert the desired squeezing or filming pressure on the aerosol liquid driven outwardly between these surfaces when the dispersion discs are rotated at high speed. While it is desirable to make the peripheral areas 1*b*′ and 10*b*′ of discs 1′ and 10′ inherently resilient, it will be appreciated that disc 1′ may be relatively stiff and rigid and disc 10′ relatively resilient, or vice versa, either of which form will provide a resilient filming pressure between the peripheral contact surfaces *t* and *t*′.

Figure 10:
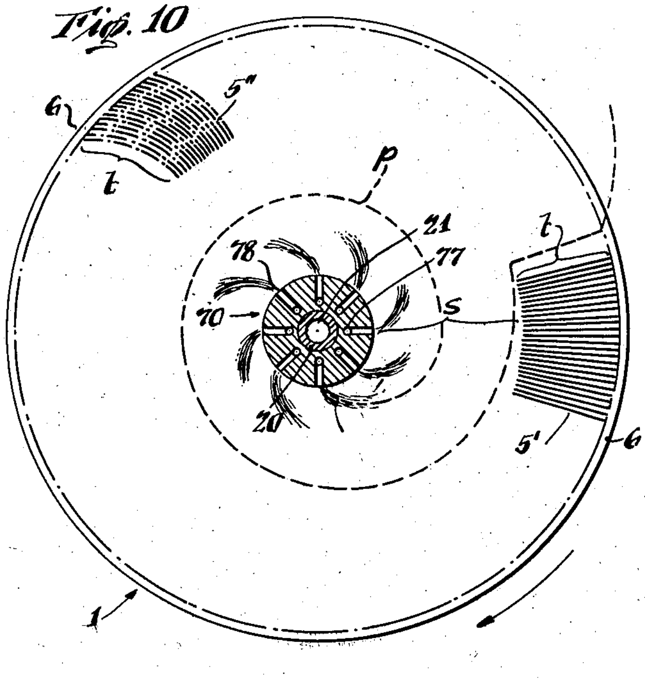
Fig. 10 is a top plan view of a lower spinning plate illustrating variants in surface scribing which may be utilized, this view also showing the theoretical path of travel of an imaginary particle across the operating surface of the spinning plate.

One or both of the dispersion members may present a surface with directional scribing or minute channels to provide a speed pick-up zone for the aerosol liquid. The scribing may be in varying shapes and forms, but sufficient to give impetus to the filming liquid. There is shown in Fig. 10 a dispersion member 1 which may have radially extending scribing 5′ extending short of the periphery thereof to present a smooth marginal edge 6 of limited width. The scribing 5′ should extend circumferentially around the surface of the disc. The scribing 5′ presents only a relatively narrow pick up band *t*, and a relatively large evening area *s* so that the aerosol liquid discharged from the passages 78 would film over a considerable central area before entering the channel scribe lines 5′. With this arrangement of scribing, the liquid ejected from the passages 78 would travel over a considerable filming surface *s*, and the liquid would have a considerable lag as theoretically indicated by the dotted line *p*.

As a further modification, Fig. 10 shows another form of scribe lines 5″ which are slightly curvilinear and which may extend short of the rim of the dispersion disc so as to present a smooth and unscribed peripheral edge 6 which may be in lapped contact with the companion dispersion disc. The curvilinear scribe lines 5″ shown would extend circumferentially around the disc surface so as to present a speed pick up band *t*.

Where an aerosol of small particle size is to be produced, the scribe lines, particularly the outer ends thereof, should be of extremely limited depth and preferably not more than a few thousandths of an inch or substantially less. The inner ends of the scribe lines as illustrated in Figs. 7 and 8 may be of somewhat greater depth if desired. It will be appreciated that the depth of the scribe lines plays an important part in determining particle size if other conditions are equal, and the finer the scribe lines the finer will be the particle size of the projected aerosol.

Figure 11:
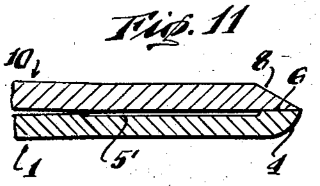
Fig. 11 is a greatly enlarged fragmentary cross sectional view of an edge portion of the paired spinning plates.
Figure 12:
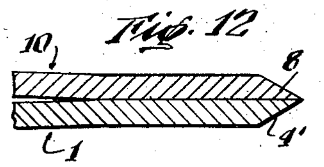
Fig. 12 is an enlarged fragmentary cross sectional view of the edge portion of a pair of spinning plates having a somewhat modified peripheral edge contour.
Figure 13:
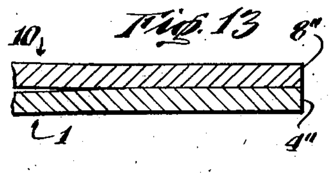
Fig. 13 is an enlarged fragmentary cross sectional view taken through an edge portion of a pair of spinning plates having a further modified peripheral edge contour.

The peripheral edge of the paired discs should preferably be shaped to permit the directed air blast to shave the end thereof with the least obstruction. Fig. 11 shows an edge contour of a pair of dispersion discs which has been found satisfactory and wherein the dispersion disc 1 has a slightly rounded edge 4 and the dispersion disc 10 has a tapered edge 8. However the dispersion disc 1 may have a more sharply inclined peripheral edge 4' as shown in Fig. 12, or the dispersion discs 1 and 10 may present relatively square edges 4'' and 8'' as shown in Fig. 13. It will thus be appreciated that various edge forms for the dispersion members may be employed depending to some extent on the direction of sweep of the air current from the blower fan across the peripheral edges of the paired dispersion members.

To make clear what is intended to be meant by the term "homogeneous particle size" there is illustrated in Fig. 14 a microscope slide 200 as viewed through the lens of a laboratory microscope. The particles 201 illustrate aerosol particles generated by the machine disclosed in this application and captured on the microscope slide held in the area of the aerosol generated by this machine. The illustration shown in Fig. 14 was made after a careful examination of the aerosol particles generated by this machine and visually illustrates the substantial uniformity in the particle size. Assuming that the lines 202 on the slide are spaced five microns apart, it is visually evident that the particle size of the generated aerosol is in the mean average of eight to ten microns in diameter, with scarcely any greater than fifteen microns in diameter. The homogeneous character of the particles illustrated in Fig. 14 is considered ideal for entomological purposes.

The microscope slide 210 shown in Fig. 15 illustrates thereon aerosol particles which vary greatly in size and mass and is a representation of the particle size attained in an aerosol generated by a prior art device which is not considered satisfactory. It will be noted that the particles vary drastically in size from three microns to fifty or more microns with no substantial uniformity. Aerosols of such variant and heterogeneous particle size are not satisfactory for entomological purposes.

The aerosol generated by this improved machine billows from the rim of the disc in a rolling cloud which rises as high as twenty or more feet and moves laterally from the machine in accordance with prevailing atmospheric currents. The lateral dispersion throughout the length of the column is substantially uniform, with the result that the areas close to the machine as well as those more distantly removed are contacted by the rolling, billowing clouds of aerosol, effecting uniform dispersion over the surface area to be treated. By making the adjustments above described, the average particle size may be varied as desired to effect the desired uniform concentration. Thus this simple machine satisfies the exacting requirements of aerosol treatments which have long been sought for in the fields of entomology, agronomy, animal husbandry, public health and medicine.

The principles of this invention may be embodied in various modifications and adaptations which, from the principles herein outlined, will become readily apparent to those skilled in the art. It is accordingly understood that this invention is not limited to the particular embodiments described and illustrated, and various omissions, substitutions and changes may be made by those skilled in the art without departing from the teachings of this invention.

What is claimed is:

1. A machine for converting liquids to aerosols which includes, a pair of superimposed dispersion plates having resilient peripheral portions and presenting adjacent surfaces whose peripheral areas are maintained in resilient face-to-face contact when stationary, means for feeding the aerosol liquid between said dispersion plates in the central area thereof, means for rotating said dispersion plates to centrifugally eject the liquid deposited between said dispersion plates from the periphery thereof, means for generating an air current, and means for directing said air current in a direction generally transversely across the periphery of said dispersion plates to directly discharge the aerosol to free atmosphere.

2. A machine for converting liquids to aerosols which includes, a plurality of generally circular superimposed dispersion discs of substantially equal diameter having resilient peripheral portions and presenting adjacent surfaces whose peripheral areas are resiliently maintained in face-to-face contact when stationary, means for feeding the aerosol liquid between said dispersion discs in the central area thereof, means for rotating said dispersion discs at a peripheral speed of from 300 to 700 feet per second to centrifugally eject the liquid deposited between said dispersion discs from the periphery thereof, means for generating a gaseous current, and means for directing said gaseous current in a direction generally transversely across the periphery of said dispersion discs to cause substantially all of said aerosol to become airborne.

3. A generator for converting liquids to aerosols which includes, a plurality of dispersion discs of substantially equal diameter having resilient peripheral portions and presenting adjacent surfaces whose peripheral areas are resiliently maintained in face-to-face contact while stationary, means for maintaining the central area of said surfaces in spaced relationship, power means for rotating said discs at a peripheral speed of from 200 to 800 feet per second, means for feeding the aerosol liquid between said dispersion discs in the central area thereof, a blower fan for generating a gaseous stream, and means for directing the gaseous stream from said fan substantially transversely across the periphery of said dispersion discs to propagate said aerosol immediately clear of the machine.

4. A generator for converting liquids to aerosols which includes, a pair of dispersion discs presenting adjacent surfaces, one of said discs having inherent resiliency and presenting a surface slightly concave with respect to the adjacent surface of the companion dispersion disc, means for pressing the peripheral surface areas of said discs into resilient face-to-face contact when stationary, means for feeding an aerosol liquid into the central space between said dispersion discs, means for rotating said discs to centrifugally eject the liquid from the periphery thereof, a casing wall extending around the periphery of said discs and terminating in close proximity thereto, and means for propelling an air stream through the circumferential space between said casing and the periphery of said discs, whereby to discharge said stream at that point into free atmosphere.

5. A generator for converting liquids to aerosols which includes, a pair of dispersion discs presenting adjacent surfaces and wherein at least one of said discs has a resilient portion, means for maintaining the peripheral areas of said discs in resilient face-to-face contact when stationary, means for maintaining the central portion of said discs in predetermined spaced and closed relationship, a tubular drive shaft fixed to said paired discs, means for supplying aerosol liquid to the tubular passage in said drive shaft, a distributor hub fixed to said drive shaft having distributing passages therein for uniformly conducting the aerosol liquid from said shaft passage to the central space between said dispersion discs, means for rotating said discs at high peripheral speed to eject the liquid from the periphery of said discs, and means for directing a gaseous stream in a direction substantially transversely across the periphery of said dispersion discs to directly discharge said aerosol into free atmosphere.

6. In a machine for converting liquids into finely divided aerosol particles, a rotatable head comprising a plurality of plate-like dispersion members having resilient peripheral portions and smooth peripheral surfaces, means for urging said dispersion members together so that their peripheral surfaces are in resilient continuous contact throughout the entire circumference when the head is stationary, the central portions of said members being spaced apart to form a central space, a duct communicating with said central space, a reservoir for liquid communicating with said duct, said head having means for rotating it at high speed whereby the centrifugal force exerted on the liquid in said head forces it out between said resiliently pressed peripheral contacting surfaces; and means for controlling the volume of liquid flow to said head to thereby regulate the size of aerosol particles centrifugally ejected from the rotating head.

7. In a machine for converting liquids into finely divided aerosol particles, a rotatable head comprising a plurality of plate-like dispersion members having substantially smooth peripheral surfaces, at least one of said dispersion members being inherently resilient means to press their peripheral surfaces into resilient, continuous contact throughout the entire circumference when the head is stationary, the central portions of said dispersion members being spaced apart to form a central space, a duct communicating with said central space, a reservoir for liquid communicating with said duct, and means for rotating the head at high speed, whereby the centrifugal force exerted on the liquid in said head forces it out between said resiliently pressed peripheral contacting surfaces.

8. In a machine for converting liquids into finely divided aerosol particles, a rotatable head comprising a plurality of plate-like dispersion members having substantially smooth peripheral surfaces and resilient peripheral portions, means for urging said dispersion members together so that their peripheral surfaces are in resilient contact throughout the entire circumference when the head is stationary, the central portions of said members being spaced apart to form a central space, a duct communicating with said central space, said central space being otherwise closed, a reservoir for liquid communicating with said duct, said head having means for rotating it at high speed, whereby the centrifugal force exerted on the liquid in said head forces it out between said resiliently pressed peripheral contacting surfaces and creates a suction in said central space to draw in additional liquid from said reservoir.

9. In a machine for converting liquids into finely divided aerosol particles, a rotatable head comprising a plurality of plate-like dispersion members having substantially smooth peripheral surfaces and resilient peripheral portions, means for urging said dispersion members together so that their peripheral surfaces are in resilient contact throughout the entire circumference when the head is stationary, the central portions of said members being spaced apart to form a central space, a central shaft on which said dispersion members are mounted, said shaft having an internal duct communicating with said central space, said central space being otherwise closed, a reservoir for liquid communicating with said duct, said shaft having means for rotating said head at high speed, whereby the centrifugal force exerted on the liquid in said head forces it out between said resiliently pressed peripheral contacting surfaces and creates a suction in said central space to draw additional liquid from said reservoir.

10. In a machine for generating and directing an aerosol fog stream, a rotatable head comprising a plurality of dispersion discs having resilient peripheral portions and presenting adjacent surfaces, means for maintaining the peripheral surface of said discs in resilient contact when said head is stationary, means for feeding aerosol liquid to said head, means for spinning said head to centrifugally eject said liquid from the periphery thereof as an aerosol, a tubular casing having an opening terminating in an edge, said head being disposed centrally with respect to said opening to form an annular discharge space between said edge and the periphery of the head, means for propelling an air stream through said annular discharge space, whereby to pick up the aerosol and deliver it directionally to free atmosphere as an aerosol fog stream.

JOHN W. HESSION, Jr.

REFERENCES CITED

The following references are of record in the file of this patent:

UNITED STATES PATENTS

| Number | Name | Date |
|---|---|---|
| 409,978 | Kisinger | Aug. 27, 1889 |
| 439,173 | Newbury et al. | Oct. 28, 1890 |
| 442,865 | De Kinder | Dec. 16, 1890 |
| 473,759 | Klein | Apr. 26, 1892 |
| 930,483 | Kershaw | Aug. 10, 1909 |
| 976,350 | Ersam et al. | Nov. 22, 1910 |
| 1,137,238 | Sherman | Apr. 27, 1915 |
| 1,289,779 | Howard | Dec. 31, 1918 |
| 1,361,607 | Nichols | Dec. 7, 1920 |
| 1,420,722 | Mac Lachlin | June 27, 1922 |
| 1,585,393 | Laughlin | May 18, 1926 |
| 1,627,690 | Denison | May 10, 1927 |
| 1,655,932 | Wreesman | Jan. 10, 1928 |
| 1,719,869 | Boyd | July 9, 1929 |
| 1,735,692 | Nyrop | Nov. 12, 1929 |
| 1,849,710 | Cramer | Mar. 15, 1932 |
| 2,086,921 | Norris | July 13, 1937 |
| 2,157,416 | Kjos | May 9, 1939 |
| 2,159,400 | Preston | May 23, 1939 |
| 2,165,783 | Burgess, Jr. | July 11, 1939 |
| 2,211,552 | Bernstein | Aug. 13, 1940 |
| 2,233,855 | Suss | Mar. 4, 1941 |
| 2,251,475 | Lee | Aug. 5, 1941 |

FOREIGN PATENTS

| Number | Country | Date |
|---|---|---|
| 562,749 | France | Nov. 17, 1923 |
| 131,306 | Switzerland | Apr. 16, 1929 |